United States Patent [19]
Fletcher et al.

[11] 3,964,306
[45] June 22, 1976

[54] SYSTEM FOR MEASURING REYNOLDS IN A TURBULENTLY FLOWING FLUID

[76] Inventors: James C. Fletcher, Administrator of the National Aeronautics and Space Administration, with respect to an invention of Dah Yu Cheng, Palo Alto, Calif.

[22] Filed: Jan. 29, 1975

[21] Appl. No.: 545,284

Related U.S. Application Data

[63] Continuation-in-part of Ser. No. 424,013, Dec. 12, 1973, abandoned.

[52] U.S. Cl. .............................. 73/194 R; 73/147; 73/189
[51] Int. Cl.² ........................................ G01M 9/00
[58] Field of Search .......... 73/147, 228, 189, 194 R, 73/194 M, 194 B

[56] References Cited
UNITED STATES PATENTS

| | | | |
|---|---|---|---|
| 2,780,937 | 2/1957 | Haynes et al. | 73/189 |
| 2,959,052 | 11/1960 | Alexander et al. | 73/189 |
| 2,985,014 | 5/1961 | Duersam | 73/228 |
| 3,217,536 | 11/1965 | Motsinger et al. | 73/189 |
| 3,264,869 | 8/1966 | Erdely | 73/189 |
| 3,552,204 | 1/1971 | Tourmen | 73/170 A |
| 3,695,103 | 10/1972 | Olson | 73/189 |
| 3,696,673 | 10/1972 | Ribner et al. | 73/194 B |

OTHER PUBLICATIONS
Hupley et al., A Fast Response Anemometer for Measurng The Turbulence Char. of Natural Wind, J. Phys., July 71, pp. 489–494.

*Primary Examiner*—James J. Gill
*Assistant Examiner*—Anthony V. Ciarlante
*Attorney, Agent, or Firm*—Darrell G. Brekke; Armand G. Morin, Sr.; John R. Manning

[57] ABSTRACT

A system for measuring momentum flux in a turbulently flowing fluid including a sensing apparatus for dynamically sensing the mainstream and the cross velocity components of the fluid, a transducer operative to provide two electrical output signals representative of the velocity components in the mainstream and in the cross direction, and signal processors to derive the Reynolds stress wave and the Reynolds stress.

10 Claims, 8 Drawing Figures

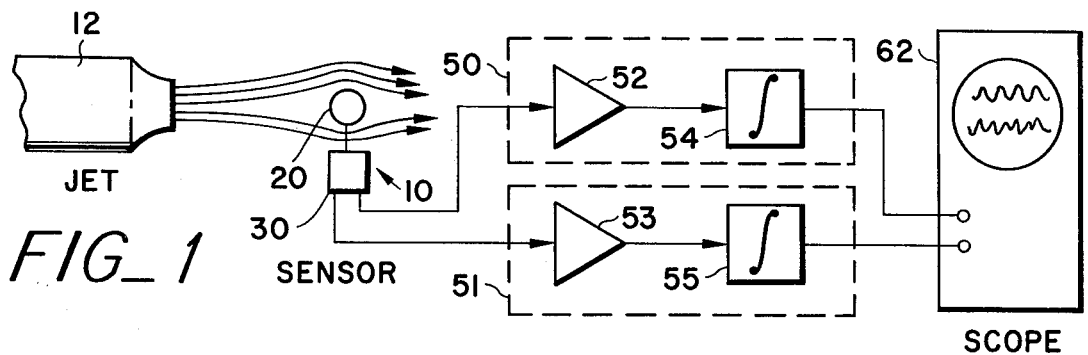
FIG_1
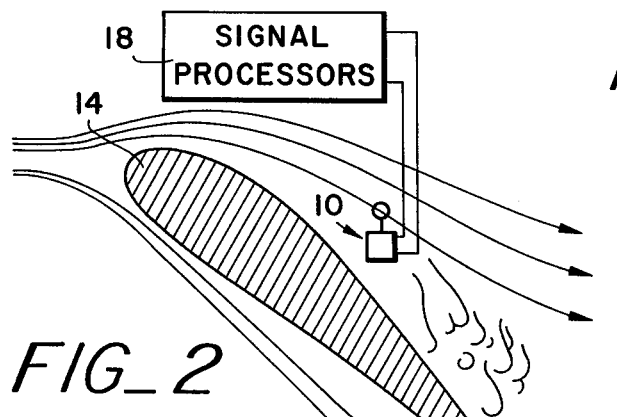
FIG_2
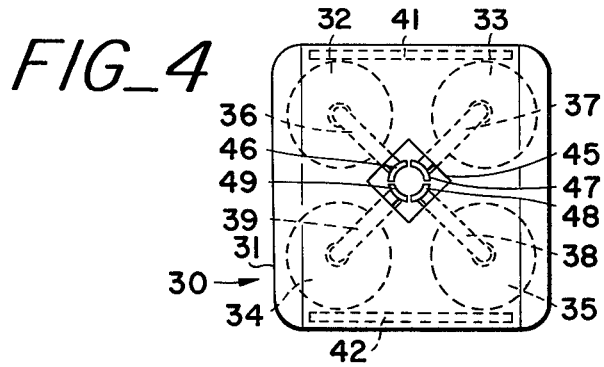
FIG_4
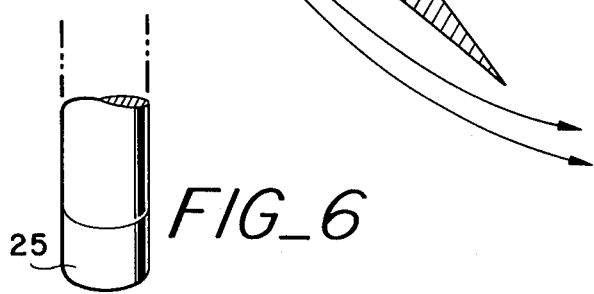
FIG_6
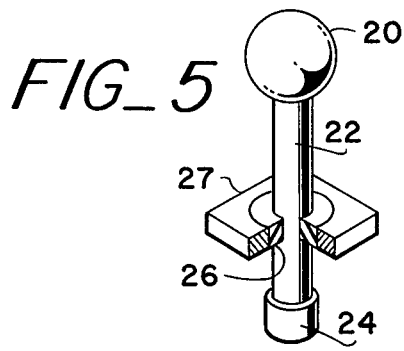
FIG_5
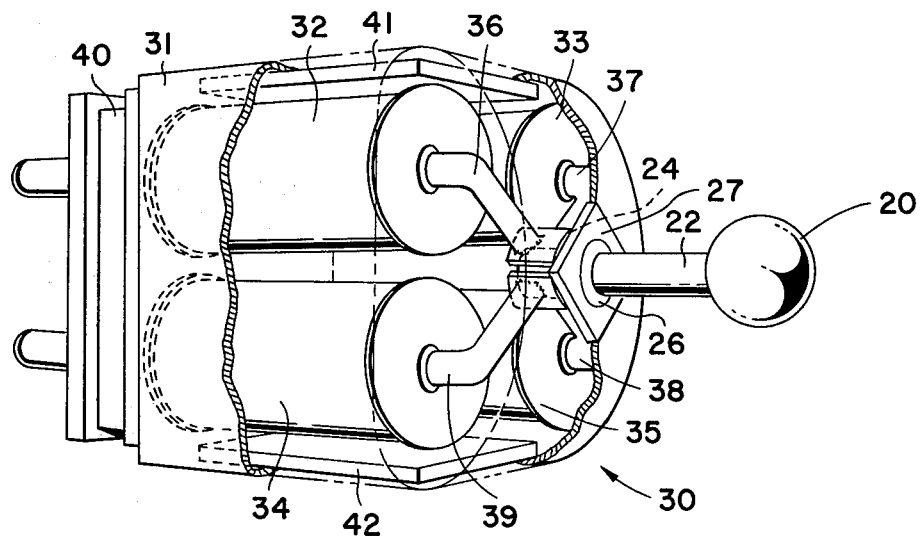
FIG_3

SYSTEM FOR MEASURING REYNOLDS IN A TURBULENTLY FLOWING FLUID

The invention described herein was made in the performance of work under a NASA contract and is subject to the provisions of Section 305 of the National Aeronautics and Space Act of 1958, Public Law 85-568 (72 Stat. 435, 42 U.S.C. 2457).

This application is a continuation-in-part of application Ser. No. 424,013 filed Dec. 12, 1973 (now abandoned), and the content of that application is expressly incorporated hereby by reference.

BACKGROUND OF THE INVENTION

1. Field of the Invention

The present invention relates generally to a system for measuring turbulence in fluid flow and more particularly to such a system that measures momentum flux caused by turbulent fluctuations.

There are two fundamentally different types of flow — laminar and turbulent. Turbulent flow is much more common in nature and in engineering devices than laminar flow. For example, the flow in rivers and the motion of the air in the atmosphere are practically always turbulent. The fluid motions with which the engineer is concerned are turbulent in most cases. In turbulent motion the velocity and pressure at a fixed point do not remain constant with time but perform irregular fluctuations of high frequency. In describing a turbulent flow in mathematical terms, it is convenient to separate it into a mean motion and a fluctuating or eddying motion. In turbulent flow the fluctuations influence the mean motion in such a manner that the latter exhibits an apparent increase in the resistance to deformation. Stated another way, the presence of fluctuations manifests itself in an apparent increase in the viscosity of the fundamental flow.

The flow adjacent to the surface of a body moving in a fluid is called the boundary layer. The flow in this layer may be laminar at low Reynolds numbers $$\text{(Reynolds number} = R = \frac{\text{inertia force}}{\text{viscous force}}\text{)}$$

and may become turbulent when the Reynolds number exceeds a certain critical value. This change has a favorable consequence because the violent intermingling of particles enables the turbulent layer to stick to the surface better than does the laminar layer, which contains less kinetic energy and leaves the surface earlier. At low Reynolds numbers, especially in the range where the drag coefficient of a sphere or cylinder is almost constant and has the larger value, the boundary layer is laminar and the early separation of the flow creates a broad wake filled by vortices. Then, at a certain high Reynolds number, the flow in the boundary layer becomes turbulent, the separation is delayed, and the size of the wake is reduced.

In many fields, and especially in the field of aeronautics, it is important to be able to measure the transfer of momentum flux due to turbulent fluctuations. In aircraft design, the Navier-Stokes equations are available tools which may be employed to solve for the drag and lift characteristics of a given airfoil in turbulent flow. These equations cannot be solved unless the time-averaged momentum fluxes associated with turbulent flow are known. No apparatus is known in the prior art which will measure in real time instantaneous momentum flux (Reynolds stress wave) and time-averaged momentum flux (Reynolds stress).

At present, the standard instrument for measuring air velocity is the hot-wire anemometer. The hot-wire anemometer is a resistive flow-velocity transducer which consists essentially of a thin heated wire supported at its ends so that it loses heat to the air stream which is being measured. This convective heat loss varies approximately with the square root of fluid velocity. Two operating modes are used for the hot-wire anemometer. In both modes the wire is heated by the current flowing through it. When the wire is operated at constant current, its resistance increases with cooling and the resulting bridge unbalance produces an output voltage which can be related to fluid velocity. Faster response time is obtained by operating the transducer in a constant-temperature mode. Sometimes two-hot-wire anemometers are oriented in a cross configuration to obtain "directional" information. This arrangement will only work if the flow is planar (in the plane of the two wires). Obviously, any turbulence transverse or oblique to the plane of the wires will cause cooling of the wires and will generate errors. The wire in a hot-wire anemometer cannot discern whether air flows are approaching from the side, top, bottom, or any other direction.

In addition to the above disadvantage, the hot-wire anemometer is unsatisfactory because it is influenced by parameters of the fluid that is to be measured (density, temperature, chemical composition).

Another prior art device is based on the principle of measuring the doppler shifts of light scattered from small suspended particles in the flowing stream. However, the data obtained from these measurements is that of a spectrum of mainstream and cross velocities of a particular particle as a function of time and accordingly the data must be tediously correlated to be useful. Moreover, this technique is further dependent upon the density fluctuation of the fluid.

In yet another device for measuring the flow unsteadiness in a turbulent fluid flow, a device comprising a lift-sensor element having a lift-sensing surface has been developed. This device senses flow velocity disturbances perpendicular to a mainstream fluid flow and develops a time varying lift force with corresponding displacement responsive to time variation of the velocity disturbances. Thus, this probe is limited in that it detects only the perturbed velocity vectors in other than the mainstream direction and thus cannot be used to provide measurements of drag forces in the fluid. In addition, the probe is sensitive to the positioning of the lift-sensor and hence, its indications are dependent upon the rate of change of the angle of attack of the fluid.

Examples of prior art fluid velocity and/or direction sensing instruments are found in U.S. Pat. No. 3,696,673, "Methods and Means of Measuring Velocity Fluctuations in Unsteady Flow," Ribner et al.; U.S. Pat. No. 3,217,536, "Force Vector Transducer," Motsinger et al.; U.S. Pat. No. 3,552,204, "Means for Detecting and Recording Water Wave Direction," Tourmen; U.S. Pat. No. 2,985,014, "Anemometer," Doersam, Jr.; U.S. Pat. No. 3,264,869, "Process and Apparatus for Studying Currents," Erdely; and U.S. Pat. No. 3,695,103, "Current and Turbulence Meter," Olson. None of these patents reveal instruments capable of measuring the transfer of momentum flux resulting from turbulent flow.

SUMMARY OF THE PRESENT INVENTION

It is therefore a primary object of the present invention to provide a system for directly measuring momentum flux in a tubulently flowing fluid.

Still another object of the present invention is to accomplish the previously stated object by providing spherical sensing means for dynamically sensing velocity components of the fluid in the mainstream and in the cross directions and to provide electrical output signals representative of the velocity components, Reynolds stress wave, and Reynolds stress.

Briefly, the present invention is directed toward a system for measuring the time varying momentum flux due to turbulent shear and includes sensing means for disposition in the flowing fluid to sense the velocity components of the fluid in the mainstream and in the cross directions comprising a spherically-shaped probe portion which moves in accordance with the drag forces acting thereon. The probe is fastened to one end of an elongated member and a magnetic armature is attached to the opposite end. The elongated member is centrally supported in such a manner that it has 2° of freedom — 1° along the mainstream and one normal thereto. The magnetic armature is disposed near coils each having a pole piece. When the probe, elongated member and armature are moved, the coils generate a first electrical signal representative of the member displacement in the mainstream direction and a second electrical signal representative of the member displacement transverse to the mainstream direction. First signal processing means responsive to the first electrical output signal provides an output indicative of the fluid velocity component in the mainstream direction, and second signal processing means responsive to the second electrical output signal provides an output indicative of the fluid velocity component in the transverse direction. Additional circuit means, including a product generator, provides signals representative of the Reynolds stress wave and the Reynolds stress.

An important advantage of this invention is that measurements of instantaneous momentum flux and time-averaged momentum flux are provided on a real time base.

These and other objects and advantages of the present invention will no doubt become apparent to those of ordinary skill in the art after having read the following detailed description of the preferred embodiments which are illustrated in the several figures of the drawings.

IN THE DRAWINGS

FIG. 1 is a simplified schematic illustration of a velocity measuring system in accordance with the present invention;

FIG. 2 is a simplified schematic illustration of the instant invention in an aeronautical environment;

FIG. 3 is a perspective view of the drag sensing apparatus in accordance with the present invention with portions of the apparatus housing broken away for clarity;

FIG. 4 is a plan view of the transducer housing for receiving the drag sensing probe in accordance with the present invention;

FIG. 5 is a perspective view of the drag sensing probe in accordance with the preferred embodiment of the present invention;

FIG. 6 is a perspective view of a portion of an alternative embodiment of another drag sensing probe in accordance with the present invention;

DETAILED DESCRIPTION OF THE PREFERRED EMBODIMENT

Figure 7:
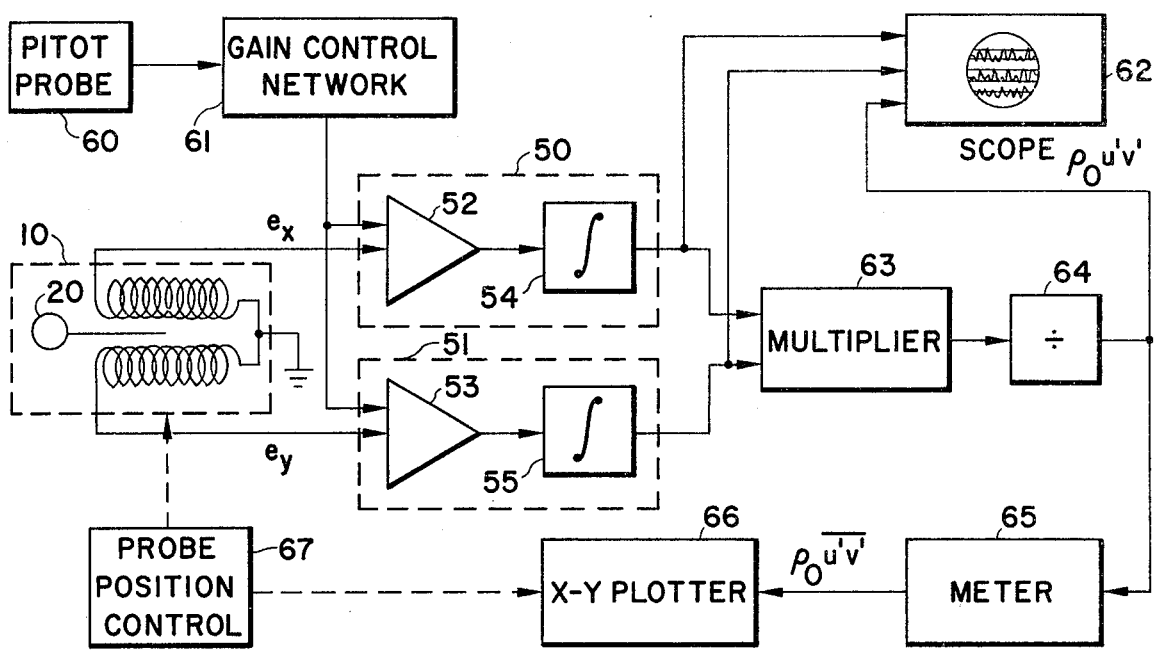
FIG. 7 is a schematic diagram of the system for measuring momentum flux in accordance with the present invention.

In order to diagnose turbulent flow characteristics it is highly desirable to have a device that will measure the transfer of momentum flux as well as instantaneous velocity. Once the time-averaged momentum flux (Reynolds stress) is known, an aircraft designer, for example, can employ the information to calculate the drage and lift characteristics of a proposed wing design, a fuselage design, etc.

FIG. 1 depicts a system for producing first and second signals representative of two instantaneous orthogonal velocities. A sensor 10 with a spherical probe 20 and a transducer 30 is placed in the turbulent flow exhausted by jet engine 12. Probe 20 is free to work in two orthogonal directions, one along the mainstream and one transverse to the mainstream direction. Hereinafter, the axis parallel to the mainstream direction will be referred to as the x axis, and the axis normal to the mainstream direction will be referred to as the y axis.

The turbulent motion along the x axis will be referred to as $u$ and the turbulent motion along the y axis will be referred to as $v$.

$$\overline{u} = \overline{u} + u'$$

$$v = \overline{v} + v'$$

wherein
$\overline{u}$ = the average velocity along the x axis,
$\overline{v}$ = the average velocity along the y axis,
$u'$ = the instantaneous velocity along the x axis, and
$v'$ = the instantaneous velocity along the y axis.

Sensor 10 senses the time variations of drag of sphere 20 along the x and y axes. First and second signals which are functions of the orthogonal drag forces are generated by the transducer 30 and fed into processing circuits 50 and 51, respectively. The first transducer signal, a function of the x-axis drag forces, is amplified in amplifier 52 and integrated in integrator 54. The second transducer signal, a function of the y-axis drag forces, is amplified in amplifier 53 and integrated in integrator 55. The outputs of integrators 54 and 55 are representative of instantaneous velocities $u'$ and $v'$, respectively, and they are displayed on dual-trace oscilloscope 62.

FIG. 2 shows how sensor 10 can be used to measure characteristics of turbulent flow near the upper surface of an airfoil 14. Signal processors 18 represent the circuitry of the embodiment illustrated in FIG. 1 or the embodiment depicted in FIG. 7.

Turning now to FIGS. 3–6, the simple sensor 10 is shown in several views. In accordance with the present invention the drag sensing device 10 comprises a spherically-shaped probe portion 20 for sensing drag components along the x and y axes. To quicken the response of the sensor 10 to variations in the instantaneous fluid flow, the sphere is hollowed so as to reduce its mass. The sphere is preferably fabricated from glass although quartz, plastic, or platinum materials can also be used. The sphere surface is preferably smooth.

$$C_D = \frac{D}{\frac{1}{2}\rho V^2 A}$$

wherein
$C_D$ = coefficient of drag
$D$ = drag
$\rho$ = density of the fluid
$V$ = free stream velocity of fluid
$A$ = frontal area of a body exposed to flow direction
$\frac{1}{2}\rho V$ = dynamic head
The Reynolds number of a sphere is $$R = \frac{\rho V d}{\mu} = \frac{\text{inertia force}}{\text{friction force}}$$

wherein
$d$ = the diameter of the sphere
$\mu$ = viscosity

Figure 8:
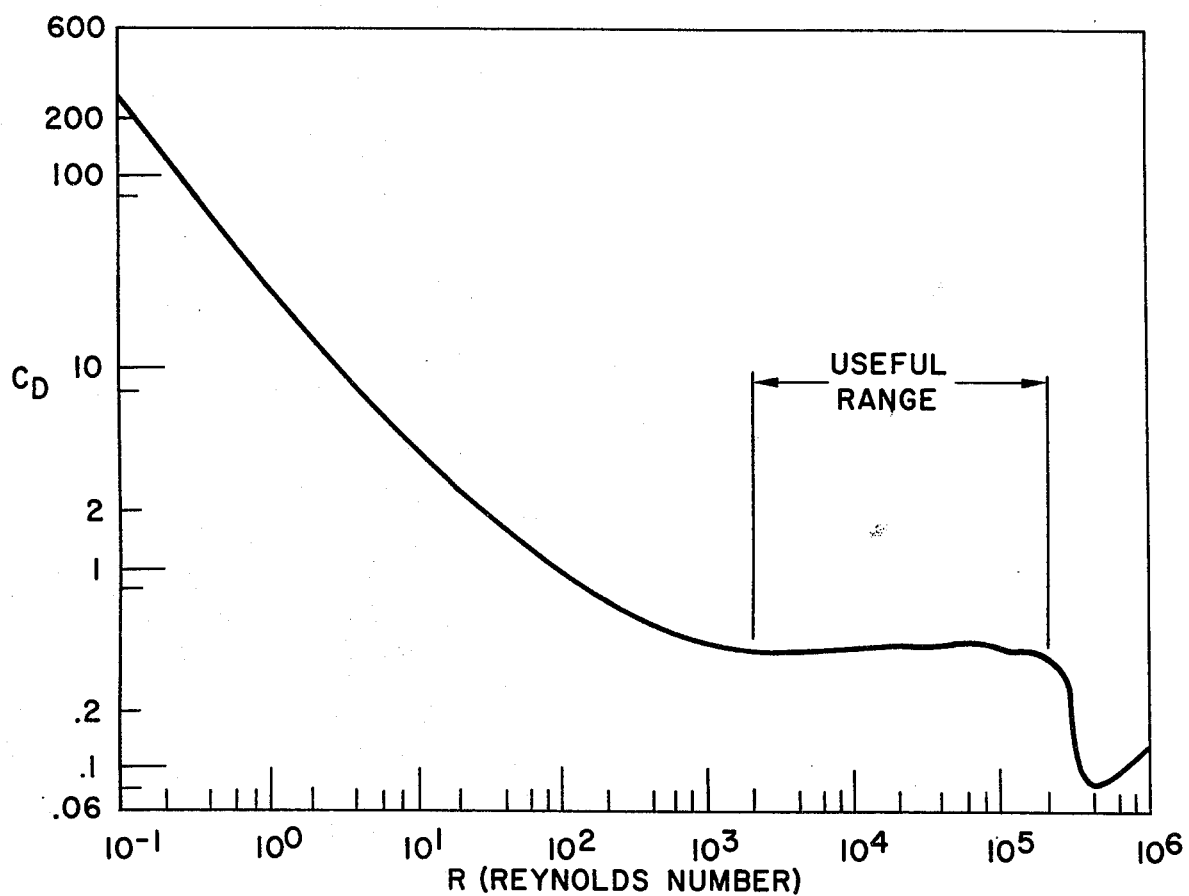
FIG. 8 is a graph illustrating the variation in drag coefficient $C_D$ for a sphere as a function of Reynolds number R.

FIG. 8 is a log graph depicting the variation in drag coefficient for a sphere as a function of Reynolds number. The drag force about a sphere is largely due to pressure defects from flow separation. The separation angle of a laminar flow about a sphere increases with Reynolds number but the separation angle becomes substantially constant from a Reynolds number of $2 \times 10^3$ to $2 \times 10^5$. The angle suddenly decreases to a small value when R is larger than $2 \times 10^5$. The diameter of spherically-shaped probe 20 should be such that the Reynolds number for the probe is within the "useful range" designated in FIG. 8. From the previous drag equation it is apparent that when the coefficient of drag $C_D$ is constant, the drag force D is directly proportional to the dynamic head ($\frac{1}{2}\rho V^2$). Thus, where density is constant, the drag is a function of the fluid velocity only.

As the Reynolds number of a sphere is directly proportional to the velocity of the fluid in which it is immersed, probes used in high velocity fluids must be smaller than probes used in low velocity fluids. In one embodiment of the invention used for measuring the exhaust of a jet engine, the sphere diameter was 0.15 inch and the total weight of the sensing elements was less than 1/10 gram. Drag forces up to 10 grams were encountered and safely handled by the sensor.

A rigid thin elongated member 22 depends from the spherical sensor 20 and is secured thereto by epoxy. Member 22 has a permeable magnetic material 24 affixed to its distal end. In the preferred embodiment, the member 22 is a cylindrical aluminum rod and the magnetic material 24 is a high-mu material epoxied to the rod as shown in FIG. 5. However, in an alternative embodiment, a permanent magnet 25 such as shown in FIG. 6 can be secured as by epoxy to member 22. Preferably, the length of member 22 is approximately ½ inch so that the time delays of only a few microseconds are introduced between the spherical probe 20 and transducer 30. A visco-elastomeric collar 26 preferably formed from a silicon rubber material is fastened around member 22 near the midpoint of the rod. The collar 26 is surrounded by and cemented to the inside faces of a support 27 which may particularly be formed from a malleable metal such as brass. The support 27 is shaped to snugly fit within the opening 45 of housing 31 as illustrated in FIGS. 3 and 4 such that the sensing means 10 is supported by the housing 31 and pivotal about the rubber collar 26.

Accordingly, when the sensor is positioned in a turbulently flowing fluid, the spherically-shaped probe 20 causes a drag, or resistance to the fluid flow. When the fluid strikes the smooth surface of probe 20, it causes the probe to move in the resultant direction of fluid flow whereby the member 22 pivots about the rubber collar 26 and causes a corresponding displacement of the magnetic portion 24. The circular fit of the rubber collar within the housing allows the element to have 2° of freedom. The displaceable magnetic portion 24 defines a magnetic armature.

Since turbulently flowing fluids fluctuate in most cases at frequencies less than 20 kHz, it has been found that stereocartridges which are commonly used in sterophonic phonographs are adaptable to provide the transducing means 30 for electromagnetically sensing the displacement of the magnetic armature of the probe 20. One stereophonic cartridge that is readily adaptable for use in this invention is the model Rex 66X stereophonic cartridge manufactured by the Empire Scientific Corporation of Garden City, N.Y. This cartridge is completely described in U.S. Pat. Nos. 2,875,282 and 3,441,668 and the subject matter and teachings of those patents are incorporated by reference herein as a part of the disclosure of this invention.

The transducer 30 is shown in FIG. 3 with portions of its housing 31 broken away for clarity and in plan view in FIG. 4 which illustrates the opening 45 in the housing for receiving the support portion 27 of the spherically-shaped probe 20. As illustrated therein, the electromagnetic transducer 30 comprises four coils, 32, 33, 34 and 35 aligned with the respective axes thereof parallel to one another and that are respectively seated on the rearward sections of four pole pieces 36, 37, 38 and 39. The pole pieces extend through the central regions of the respective coils, bend toward the center of the transducer structure, and flare out to define pole faces 46, 47, 48 and 49 respectively for receiving therebetween the magnetic armature 24. One pole face of a permanent field magnet structure 40 which is axially magnetized in the elongated direction of the four pole pieces is affixed as by epoxy cement to the rearward end faces of pole pieces 36, 37, 38 and 39. Thus, two sets of core systems are described, a first comprising a magnetic circuit including pole pieces 36 and 39 and a second including pole pieces 37 and 38, each set of pole pieces having two pairs of confronting arcuately shaped pole end faces which define a common air gap. In addition, two balancing magnets 41 and 42 are utilized to oppose the magnetomotive force applied by the rear field magnet to the adjacent pole pieces 36–39. The particular electrical connections between cooperating coil pairs 32, 33, 34 and 35 of the two cooperating pairs of pole pieces are made in a manner well known to the art and require no further description. The leads of the coils are connected to the terminals protruding from the bottom of the transducer 30, with diagonal pins connected to a common ground and the other diagonal pins serving to conduct the respective output electrical signals. It is also recognized that the four gap-confronting pole faces of all four pole pieces 36–39 have pole faces that are similarly shaped to the outer periphery of the magnetic armature, and are preferably cylindrically arcuate pole faces defining between them a cylindrical airgap.

The operation of the transducer 30 is based on the induced field "moving magnetic armature" principle.

As the magnetic armature is displaced from a neutral position by movement of the spherical probe 20, the magnetic coupling in the two magnetic circuits is changed causing a corresponding magnetic field or flux change. The four coils 32, 33, 34 and 35 are fed the changes in magnetic field gated by the moving armature and generate a first electrical output signal in response to the displacement of the armature in the mainstream direction and also generate a second electrical output signal corresponding to the displacement of the member in the cross direction. The direction of movement of the armature determines whether the resulting electrical output signal will be produced by the first channel or the second channel, the amount of movement determining the amplitude of the signal. When the above-described Empire transducer model is utilized in sensor 10, the frequency response is 8–34,000 Hz at ± 3 db, and the channel separation at 1 kHz is 30 db. By utilizing suitable probe diameters, sensor 10 may be used, for example, to measure subsonic through supersonic air streams. The probe is very rigid and thus it may be used to measure flow characteristics in high dynamic loading conditions.

The two electrical signals $e_x$ and $e_y$ emanating from the sensor 10 are proportional to the time variations of drag along the x and y axes, respectively. The signal $e_x$, representative of the x-axis drag forces, is proportional to $$\tfrac{1}{2} B\, C_D\, A\rho_0\, \overline{u} \left[ \frac{1}{\rho} \frac{d\rho}{dt} \overline{u} + 2\, \frac{du'}{dt} \right]$$

and the signal $e_y$, representative of the y-axis drag forces, is proportional to $$\tfrac{1}{2} B\, C_D\, A\rho_0\, \overline{u}\, (dv'/dt)$$

where
B is a scale factor (accounting for the conversion from flow to an electrical signal),
$C_D$ is the coefficient of drag of probe 20,
A is the frontal area expressed by the sphere to the flow,
$\rho_0$ is the average density of the fluid,
$\overline{u}$ is the average velocity in the mainstream direction (along the x axis),
$t$ is time, and
$v'$ is the instantaneous velocity in the direction normal to the mainstream direction (along the y axis).

Turning now to FIG. 7 of the drawings, a schematic diagram of the momentum flux measuring system of the present invention is illustrated. Electrical signals $e_x$ and $e_y$ are generated by the coils of transducer 30 in response to the two-degree movement of spherical probe 20 in the turbulent flowing fluid. The first electrical output signal $e_x$ is processed in channel 50 which comprises an amplifier 52 and an integrator 54. Similarly, the second electrical output signal is processed in channel 51 which comprises amplifier 53 and integrator 55. A pitot probe 60 is utilized to measure the dynamic head of the fluid and develop a signal proportional to ½ $\rho_0\, u^2$. For convenience, the pitot probe may be placed directly downstream from the sensor 10. Gain control 61 produces a signal representative of the square root of the pitot probe signal. The gain of amplifiers 52 and 53 are altered by the square root operator so that the output of amplifier 52 is proportional to $$\frac{e_x}{\sqrt{\tfrac{1}{2}\, \rho_0\, \overline{u}^2}}$$

and the output of amplifier 53 is proportional to $$\frac{e_y}{\sqrt{\tfrac{1}{2}\, \rho_0\, \overline{u}^2}}$$

One way to fashion an analog square-root generator is to insert a squarer in the feedback loop of an operational amplifier. As a result of the gain control network 61, the signals leaving amplifiers 52 and 53 no longer contain a u factor. Integrator 54 converts the $(du'/dt)$ component of $e_x$ to $u'$, and integrator 55 converts the $(dv'/dt)$ component of $e_y$ to $v'$. The output signals from integrators 54 and 55 are displayed on oscilloscope 62 and fed to multiplier network 63. The output signals from integrators 54 and 55 are directly proportional to the instantaneous orthogonal velocities $v'$ and $u'$, respectively. The product of multiplication is a signal proportional to $\rho_0\, u'v'$. The product signal is a function of a number of constants times $\rho_0\, u'v'$. If desired, for ease of calibration or other reasons, dividing network 64 may be employed to remove the surplus constants ($C_D$, A, etc.) so that the signal reaching oscilloscope 62 and meter 65 is solely a measure of $\rho u'v'$, the Reynolds stress wave or the instantaneous momentum of flux. Dividing network 61 in its simplest form may consist of a potentiometer set to divide by the inverse of the constants. The Reynolds stress wave signal is time averaged in meter 65 to produce a signal proportional to Reynolds stress $\rho_0\, u'v'$. The two signals fed into multiplier 63 are ac signals; however, the signal leaving the multiplier has an ac component as well as a dc component. Meter 65 takes the true rms value of the input signal from divider 64, displays it, and sends a signal proportional thereto to x-y plotter 66. Mathematically, the operation performed by meter 65 is $$\sqrt{(dc)^2 + (ac\ \text{rms})^2}.$$

Meter 65 may be, for example, a Hewlett Packard Model 3403C voltmeter. The value of the Reynolds stress is permanently recorded by x-y plotter 66. Probe position control 67 simultaneously moves sensor 10 along a path while it moves the pen of plotter 66 along the abscissa of the graph.

The flux of momentum per unit time through an area is always equivalent to an equal and opposite force exerted on the area by the surroundings. Herein, the area under consideration is normal to the x-axis and the Reynolds stress $\rho_0\, \overline{u'v'}$ is a shear stress in the y direction. The Reynolds stress $\rho_0\, \overline{u'v'}$ can be interpreted as the transport of the x-momentum through a surface normal to the y axis. Although the time average of $u'$ or $v'$ is zero, the mean product $\overline{u'v'}$ is different from zero.

The spherical probe 20 may be cooled so that it can be immersed in high-temperature fluids.

The aeronautical applications of the invention are not confined to the wind tunnel. Sensors made in accordance with the invention may be mounted on the wings and fuselage of an experimental airplane to provide information or warning signals for turbulent separation, unsymmetrical vortice shedding and flat spin warnings.

What is claimed is:

1. A system for measuring Reynolds stress wave in a turbulent fluid comprising:
   a sensor with a probe movable about a mainstream direction $u$ and a transverse direction $v$, said sensor having means for generatiang first and second signals representative of the time varying drag forces on said probe about said $u$ and $v$ directions, respectively;
   means for generating a third signal proportional to the average density of said fluid; and
   circuit means for converting said first, second, and third signals into a signal proportional to the Reynolds stress wave $\rho_0 u'v'$ wherein $\rho_0$ is the average density of the fluid, $u'$ is the instantaneous velocity of the fluid in the $u$ direction, and $v'$ is the instantaneous velocity of the fluid in the $v$ direction.

2. A system as claimed in claim 1 wherein said sensor comprises:
   an elongated member having a first end and a second end;
   a visco-elastomeric collar surrounding and resiliently supporting said elongated member between said first and second ends;
   a spherically-shaped probe fastened to said first end of said elongated member;
   a magnetic armature secured to said second end of said elongated member;
   a plurality of coils each having a pole piece with one end terminating near said armature, said ends being arranged to circumscribe said armature whereby electric signals are generated in said coils when said probe, elongated member and armature are moved by the turbulent fluid.

3. A system for measuring Reynolds stress in a turbulent fluid comprising:
   a sensor with a probe movable about a mainstream direction $u$ and a transverse direction $v$, said sensor having means for generating first and second signals representative of the time varying drag forces on said probe about said $u$ and $v$ directions, respectively;
   means for generating a third signal proportional to the average density of said fluid; and
   circuit means for converting said first, second, and third signals into a signal proportional to the Reynolds stress $\rho_0 \overline{u'v'}$ wherein $\rho_0$ is the average density of the fluid, $\overline{u'v'}$ is the time averaged product of $u'$ and $v'$, $u'$ is the instantaneous velocity of the fluid in the $u$ direction, and $v'$ is the instantaneous velocity of the fluid in the $v$ direction.

4. A system as claimed in claim 3 wherein said sensor comprises:
   an elongated member having a first end and a second end;
   a visco-elastomeric collar surrounding and resiliently supporting said elongated member between said first and second ends;
   a spherically-shaped probe fastened to said first end of said elongated member;
   a magnetic armature secured to said second end of said elongated member;
   a plurality of coils each having a pole piece with one end terminating near said armature, said ends being arranged to circumscribe said armature whereby electric signals are generated in said coils when said probe, elongated member and armature are moved by the turbulent fluid.

5. A system for measuring Reynolds stress wave in a turbulent fluid comprising:
   a sensor with a probe having 2° of freedom, one degree being in the mainstream direction $u$ and the other degree being in the direction $v$ normal to the mainstream, said sensor including means for generating signals $e_x$ and $e_y$ which are representative of the time varying drag forces on said probe about said $u$ and $v$ directions, respectively;
   means for producing a third signal by dividing $e_x$ by a signal proportional to $\frac{1}{2} \rho_0 \overline{u}^2$ wherein $\rho_0$ is the average density of the fluid and $\overline{u}$ is the average velocity of the fluid in the $u$ direction;
   means for producing a fourth signal by dividing $e_y$ by a signal proportional to $\frac{1}{2} \rho_0 \overline{u}^2$;
   means for integrating said third signal so as to produce a fifth signal;
   means for integrating said fourth signal so as to produce a sixth signal; and
   means for multiplying said fifth and sixth signals and thereby generating a signal proportional to the Reynolds stress wave $\rho_0 u'v'$ wherein $u'$ is the instantaneous velocity of the fluid in direction $u$ and $v'$ is the instantaneous velocity of the fluid in direction $v'$.

6. A system as claimed in claim 5 wherein said sensor comprises:
   an elongated member having a first end and a second end;
   a visco-elastomeric collar surrounding and resiliently supporting said elongated member between said first and second ends;
   a spherically-shaped probe fastened to said first end of said elongated member;
   a magnetic armature secured to said second end of said elongated member;
   a plurality of coils each having a pole piece with one end terminating near said armature, said ends being arranged to circumscribe said armature whereby electric signals are generated in said coils when said probe, elongated member and armature are moved by the turbulent fluid.

7. A system for measuring Reynolds stress in a turbulent fluid comprising:
   a sensor with a probe having 2° of freedom, one degree being in the mainstream direction $u$ and the other degree being in the direction $v$ normal to the mainstream, said sensor including means for generating signals $e_x$ and $e_y$ which are representative of the time varying drag forces on said probe about said $u$ and $v$ directions respectively;
   means for producing a third signal by dividing $e_x$ by a signal proportional to $\frac{1}{2} \rho_0 \overline{u}^2$ wherein $\rho_0$ is the average density of the fluid and $\overline{u}$ is the average velocity of the fluid in the $u$ direction;
   means for producing a fourth signal by dividing $e_y$ by a signal proportional to $\frac{1}{2} \rho \, u^2$;
   means for integrating said third signal so as to produce a fifth signal;
   means for integrating said fourth signal so as to produce a sixth signal;
   means for multiplying said fifth and sixth signals and thereby generating a signal proportional to the Reynolds stress wave $\rho_0 u'v'$ wherein $u'$ is the instantaneous velocity of the fluid in direction $u$ and $v'$ is the instantaneous velocity of the fluid in direction $v$; and means for deriving the true rms value of said Reynolds stess wave signal and thereby producing a signal proportional to the Reynolds stress $\rho_0 \overline{u'v'}$.

8. A system as claimed in claim 7 wherein said sensor comprises:
   an elongated member having a first end and a second end;
   a visco-elastomeric collar surrounding and resiliently supporting said elongated member between said first and second ends;
   a spherically-shaped probe fastened to said first end of said elongated member;
   a magnetic armature secured to said second end of said elongated member;
   a plurality of coils each having a pole piece with one end terminating near said armature, said ends being arranged to circumscribe said armature whereby electric signals are generated in said coils when said probe, elongated member and armature are moved by the turbulent fluid.

9. A system as claimed in claim 7 further comprising:
   means coupled to said rums deriving means for plotting the value of said Reynolds stress on x and y coordinates, and
   position control means for simultaneously controlling the motion of said sensor along a path in said fluid and controlling the motion of said plotting means along the x axis.

10. A system for measuring momentum flux in a fluid with turbulent fluctuations comprising:
    a sensor with a probe that is capable of moving in the mainstream direction $u$ and a direction $v$ orthogonal to the mainstream direction;
    said probe comprising a smooth sphere;
    an elongated member depending from said sphere;
    means for pivotally supporting said elongated member whereby said member is free to move in said $u$ and $v$ directions;
    transducing means coupled to said elongated member for generating first and second electrical signals which are representative of the time varying drag forces on said sphere along said $u$ and $v$ directions, respectively;
    first processing means responsive to said first electrical signal for providing a third signal which is proportional to the instantaneous fluid velocity along direction $u$;
    second signal processing means responsive to said second signal for providing a fourth signal which is proportional to the instantaneous fluid velocity along direction $v$; and
    means for multiplying together said third and fourth signals to provide a fifth signal which is proportional to the fluid momentum flux in the $v$ direction at said sphere.

* * * * *